United States Patent
Tokumo et al.

(10) Patent No.: US 7,859,529 B2
(45) Date of Patent: Dec. 28, 2010

(54) IMAGE DATA DISPLAY APPARATUS

(75) Inventors: Yasuaki Tokumo, Funabashi (JP); Toshio Nomura, Hachioji (JP)

(73) Assignee: Sharp Kabushiki Kaisha, Osaka (JP)

( * ) Notice: Subject to any disclaimer, the term of this patent is extended or adjusted under 35 U.S.C. 154(b) by 760 days.

(21) Appl. No.: 11/632,044

(22) PCT Filed: Aug. 11, 2005

(86) PCT No.: PCT/JP2005/014761

§ 371 (c)(1),
(2), (4) Date: Sep. 14, 2007

(87) PCT Pub. No.: WO2006/019039

PCT Pub. Date: Feb. 23, 2006

(65) Prior Publication Data

US 2008/0106550 A1    May 8, 2008

(30) Foreign Application Priority Data

Aug. 18, 2004 (JP) .............................. 2004-238493

(51) Int. Cl.
*G06T 15/00* (2006.01)
(52) U.S. Cl. .................. 345/419; 345/684; 382/154; 348/42; 348/47; 352/57
(58) Field of Classification Search .............. 345/419, 345/684; 352/57; 348/42, 47; 382/154
See application file for complete search history.

(56) References Cited

U.S. PATENT DOCUMENTS

| 6,023,277 | A | 2/2000 | Osaka et al. |
| 6,614,927 | B1 | 9/2003 | Tabata |
| 6,704,042 | B2 * | 3/2004 | Matsui et al. ................. 348/43 |
| 6,765,568 | B2 * | 7/2004 | Swift et al. ................. 345/419 |
| 2003/0048354 | A1 | 3/2003 | Takemoto et al. |

(Continued)

FOREIGN PATENT DOCUMENTS

EP    1406456 A2    4/2004

(Continued)

OTHER PUBLICATIONS

Japanese Office Action.

(Continued)

*Primary Examiner*—Kimbinh T Nguyen
(74) *Attorney, Agent, or Firm*—Birch, Stewart, Kolasch & Birch, LLP

(57) ABSTRACT

A controller 103, based on the positional information of the display image, selects whether the 3-dimensional image data decoded by a decoder 102 is displayed stereoscopically (in 3-dimensional display mode) or planarly (in 2-dimensional display mode) and gives notice of the selected display mode to a display portion 104. Specifically, the input positional information=display address is monitored, and if no temporal change occurs, namely if the displayed position of the image data does not change, 3-dimensional display mode is selected as the display mode. On the other hand, if there is a temporal change, namely if the displayed position of the image data varies by scrolling, 2-dimensional display mode is selected as the display mode. Thus, an image data display apparatus which can efficiently display image data on a display when display of 3-dimensional image data is scrolled is provided.

10 Claims, 17 Drawing Sheets

U.S. PATENT DOCUMENTS

| | | |
|---|---|---|
| 2003/0063186 A1 | 4/2003 | Tomono |
| 2006/0126916 A1 | 6/2006 | Kokumai |
| 2006/0126919 A1 | 6/2006 | Kitaura et al. |
| 2006/0257016 A1* | 11/2006 | Shioi et al. .................. 382/154 |

FOREIGN PATENT DOCUMENTS

| | | |
|---|---|---|
| JP | 5-30538 A | 2/1993 |
| JP | 07-327242 | 12/1995 |
| JP | 10-186277 | 7/1998 |
| JP | 11-355808 A | 12/1999 |
| JP | 2002-049004 | 2/2002 |
| JP | 2002-300611 A | 10/2002 |
| JP | 2003-111101 A | 4/2003 |
| JP | 2004-207773 A | 7/2004 |
| KR | 2003-0022583 A | 3/2003 |
| WO | WO-01/97531 | 12/2001 |
| WO | WO-2004/030376 A1 | 4/2004 |
| WO | WO-2004/107766 | 12/2004 |
| WO | WO-2006/033046 | 3/2006 |

OTHER PUBLICATIONS

Euro s ean Search Resort.

* cited by examiner

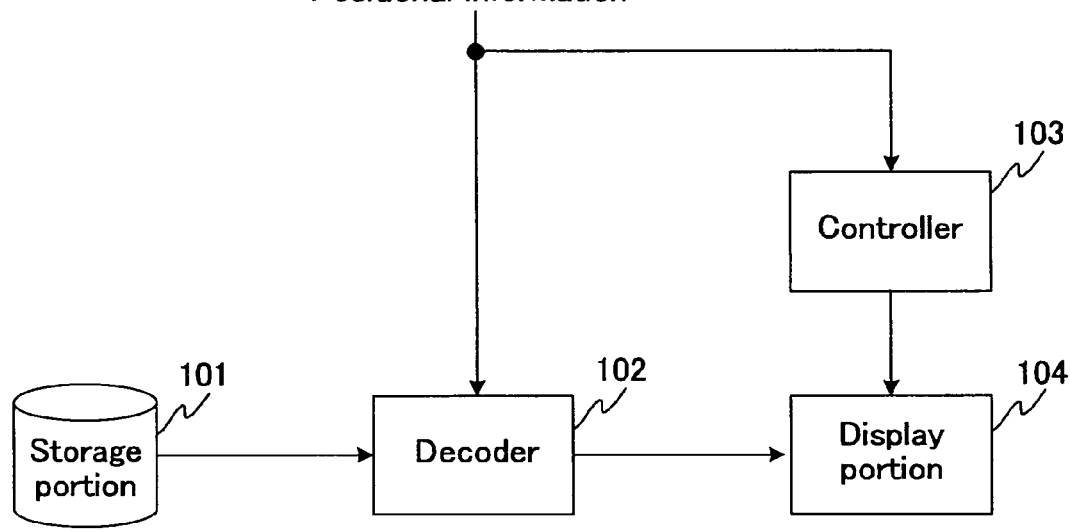
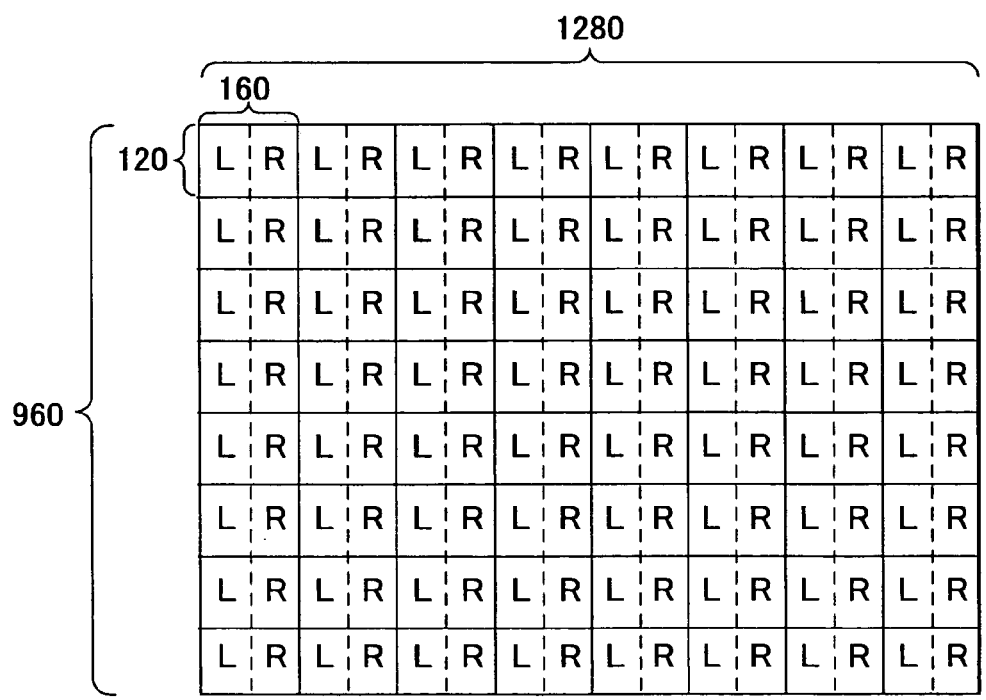

FIG. 3

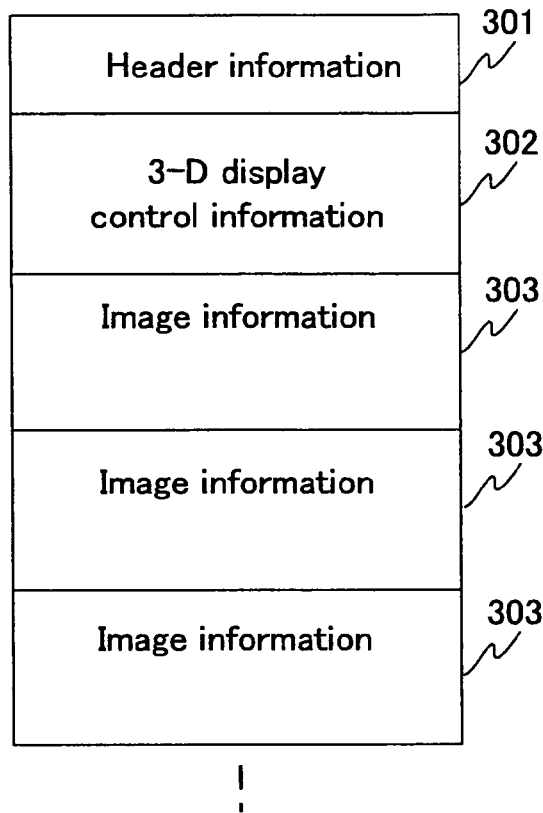

- 301 Header information
- 302 3-D display control information
- 303 Image information
- 303 Image information
- 303 Image information

FIG. 4

(a) 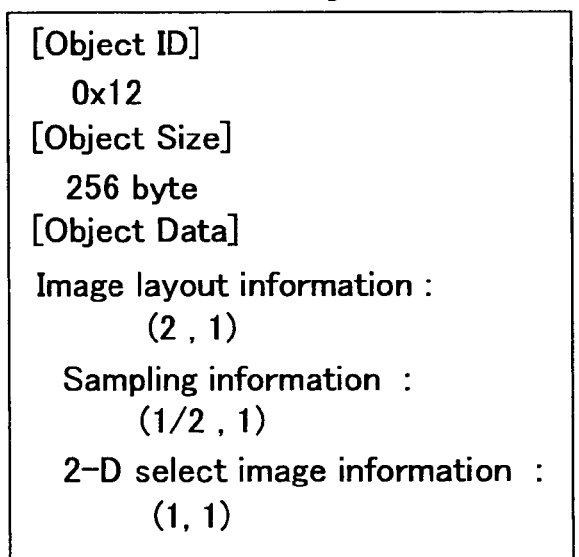

3-D display control information object

[Object ID]
 0x12
[Object Size]
 256 byte
[Object Data]
 Image layout information :
  (2 , 1)
 Sampling information :
  (1/2 , 1)
 2-D select image information :
  (1, 1)

302

(b) 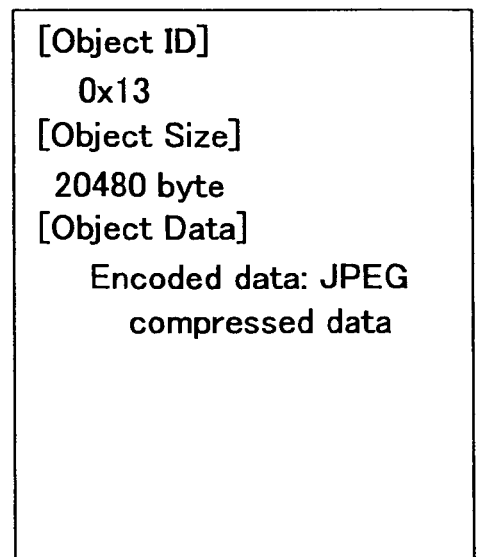

Image information object

[Object ID]
 0x13
[Object Size]
 20480 byte
[Object Data]
 Encoded data: JPEG compressed data

303

FIG. 6
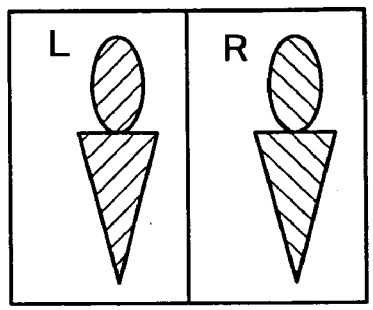
(a)
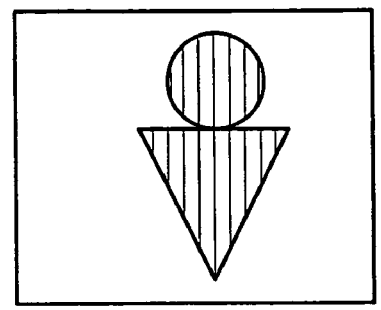
(b)
FIG. 7
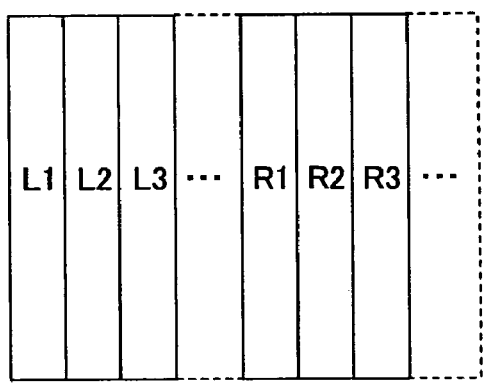
(a)
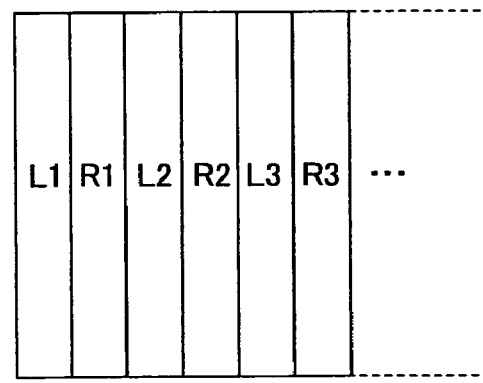
(b)

Base address : (320, 240)
Display offset : (160, 120)

Base address : (320, 240)

Display offset : (70, 190)

FIG. 11
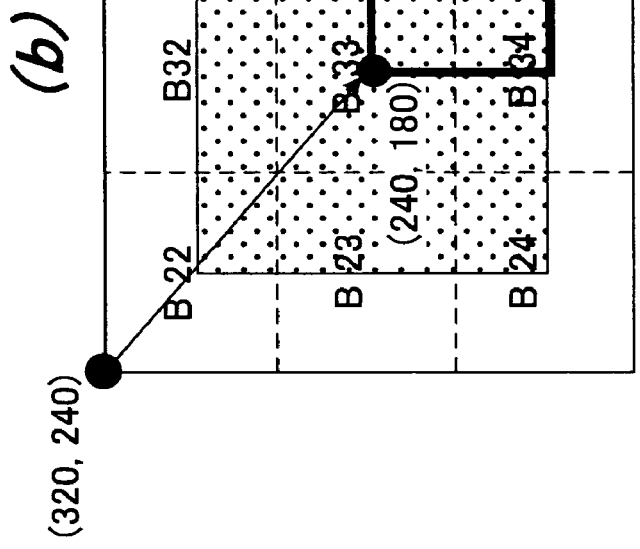
(b)
Base address : (320, 240)
Display offset : (240, 180)
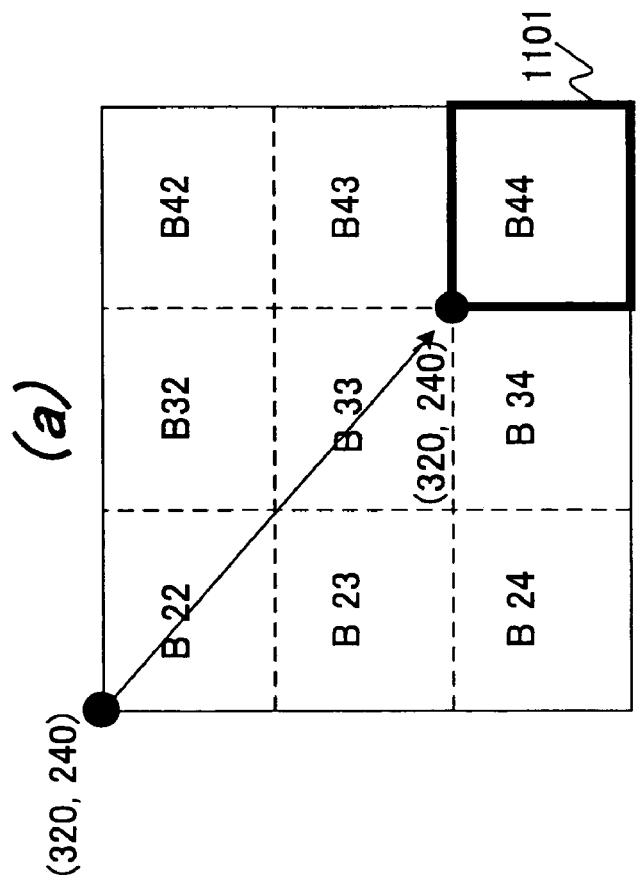
(a)
Base address : (320, 240)
Display offset : (320, 240)

Base address : (480, 360)
Display offset : (160, 120)

FIG. 14
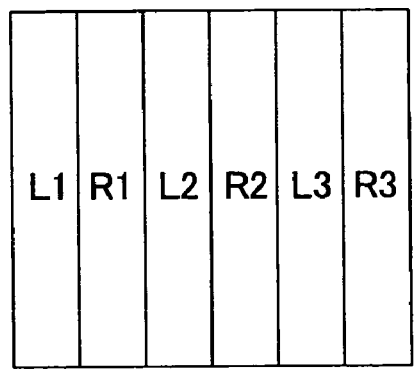
FIG. 15
(a) 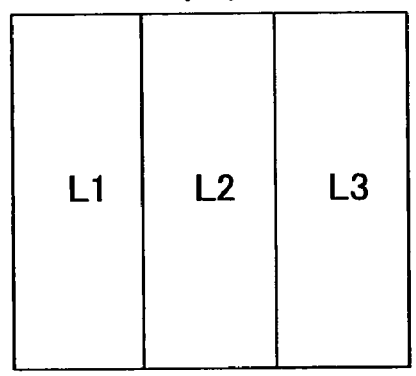 (b) 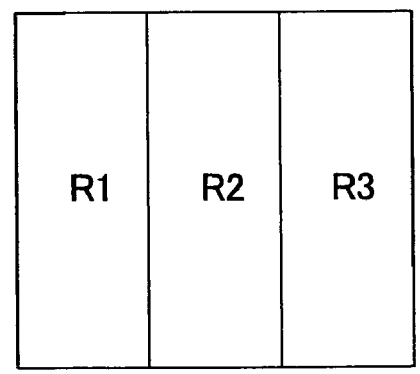
FIG. 16
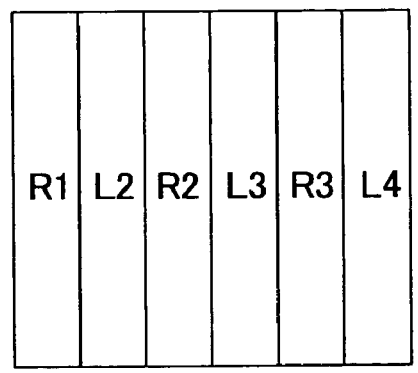

FIG. 20

| L : R<br>B¦22 | L ¦ R<br>B¦32 | L ¦ R<br>B¦42<br>2001 |
|---|---|---|
| L ¦ R<br>B¦23 | L ¦ R<br>B¦33 | L ¦ R<br>B¦43 |
| L ¦ R<br>B¦24 | L ¦ R<br>B¦34 | L ¦ R<br>B¦44 |

FIG. 21

| L ¦ R<br>B¦22 | L ¦ R<br>B¦32 | L ¦ R<br>B¦42 |
|---|---|---|
| L ¦ R<br>B¦23 | L ¦ R<br>B¦33 | L ¦ R<br>B¦43 |
| L ¦ R<br>B¦24 | L ¦ R<br>B¦34<br>2101 | L ¦ R<br>B¦44 |

L : Left-eye image
R : Right-eye image

FIG. 24
(a)
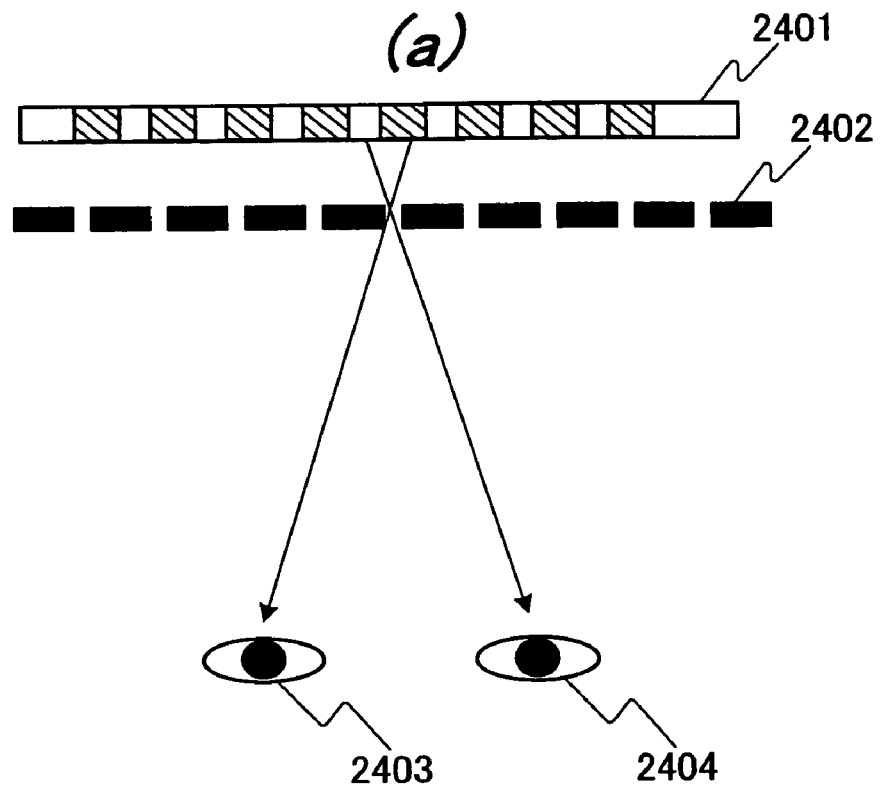
(b)
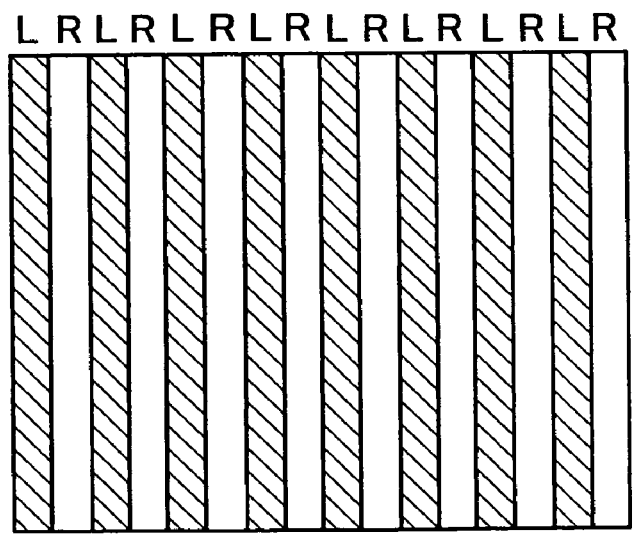

IMAGE DATA DISPLAY APPARATUS

TECHNICAL FIELD

The present invention is directed to a technology for reproducing 3-dimensional image encoded data and performing display on a display, and detailedly relates to an image data display apparatus which efficiently displays image data on a display when 3-dimensional image data is displayed while being scrolled.

BACKGROUND ART

Conventionally, various methods have been proposed which display 3-dimensional images. Of these, "binocular methods" using binocular parallax are generally used. Specifically, a stereoscopic vision is achieved by preparing left-eye and right-eye images having binocular parallax and projecting them separately on left and right eyes, respectively.

FIG. 23 is a conceptual view for illustrating a "time-division scheme" as one of the typical binocular methods.

In this time-division scheme, the left-eye image and right-eye image are arranged alternately, line by line, in vertically direction as shown in FIG. 23, so that the field for displaying the left-eye image and the field for displaying the right-eye image will be switched and displayed alternately. The left-eye image and right-eye image have half the vertical resolution compared to that in normal 2-dimensional display mode. An observer should put on shutter glasses that open and close in synchronism with the switching period of the display. The shutter used here opens the left-eye side and closes the right-eye side when the left-eye image is displayed and closes the left-eye side and opens the right-eye side when the right-eye image is displayed. With this arrangement, the left-eye image can be observed by the left eye alone while the right-eye image can be observed by the right eye alone, to achieve stereoscopic vision.

FIG. 24 is a conceptual view for illustrating another typical scheme of the binocular methods, namely "parallax barrier scheme". FIG. 24(*a*) is a view showing the principle of the cause of parallax. FIG. 24(*b*) is a view showing an image frame displayed in the parallax scheme.

In FIG. 24(*a*), an image in which stripes of the left-eye image and stripes of the right-eye image are arranged in pairs as shown in FIG. 24(*b*), is displayed on an image display panel 2401 while a so-called parallax barrier 2402 with slits arranged at intervals of a corresponding distance for the image is placed in front, whereby the left-eye image is observed by left eye 2403 alone and the right-eye image is observed by right eye 2404 alone, to achieve stereoscopic vision.

In general, when a 3-dimensional image, not limited to "time division scheme" and "parallax barrier scheme", is observed stereoscopically, easiness to create stereoscopic vision differs depending on the content of the image being displayed or the way of displaying. When, for example, with motion picture data, a video with rapid motions is viewed or special playback such as fast forward etc., is done, there occur cases where the user faces difficulties in understanding the content by stereoscopic vision because of the shortness of the time of one frame being displayed, though there are differences between individuals. There has been an example of a "stereoscopic motion picture compression encoding apparatus and stereoscopic motion picture decoding and reproducing apparatus" disclosed in the aftermentioned patent document 1, in which playback of a 3-dimensional image is displayed as a 2-dimensional image when in fast playback mode.

The operation of fast playback in the stereoscopic motion picture compression encoding apparatus and stereoscopic motion picture decoding and reproducing apparatus will be briefly described.

In the encoding apparatus, based on the left-eye image data and right-eye image data input through a camera or the like, reference image data is created first. Then, differences of the left-eye image data and the right-eye image data from the prepared reference image data are determined and output as left-eye differential data and right-eye differential data, respectively. These reference image data, left-eye differential data and right-eye differential data are compressed and encoded, and multiplexed to generate 3-dimensional image encoded data.

In the decoding and reproducing apparatus, the compressed 3-dimensional image encoded data is separated into reference image data, left-eye differential data and right-eye differential data. In normal playback mode, the reference image data, left-eye differential data and right-eye differential data are all decoded to generate a left-eye image from the reference image data and left-eye differential data and generate a right-eye image from the reference image data and right-eye differential data. With these left-eye image data and right-eye image data, a 3-dimensional image is reproduced. On the other hand, in fast playback mode, only the reference image data is decoded to reproduce the reference image as a 2-dimensional image.

Incidentally, this is also applied to the case of still image data; when the resolution of image data is higher than that of the display screen, it is only possible to display part of the image data if nothing is done. To deal with this, it is necessary to do scrolling to display the desired area of the image data. For example, if an image having a markedly great spatial resolution, such as map image data is displayed, the scrolling function is essential. Also, recent mobile phones, PDAs and the like have a miniature display for image display, and the scrolling function is essential for displaying images on such a mobile device.

Patent Document 1:
  Japanese Patent Application Laid-open Hei 7-327242

DISCLOSURE OF INVENTION

Problems to be Solved by the Invention

However, when 3-dimensional image data is scrolled while being displayed as is on the display, there has been a problem in that it becomes difficult to view the image stereoscopically, hence it is difficult to grasp the content of the image being displayed because motion of the display becomes relatively faster especially when the speed of scrolling increases.

Also, since in the conventional practice for constructing 3-dimensional image data, the entire image (1280 pixels×960 pixels in this example) is composed of one left-eye image data 2501 and one piece of right-eye image data 2502 as shown in FIG. 25, there has been a problem that a large amount of resources such as image memories etc. are needed when an image having a high spacious resolution is to be processed.

The present invention has been devised to solve the above problems, it is therefore an object to provide an image data display apparatus which can efficiently display image data on a display when 3-dimensional image data is displayed and scrolled.

Means for Solving the Problems

The present invention is an image data display apparatus capable of switching a display of an input 3-dimensional image data between a stereoscopic representation or a planar representation, comprising: a display means capable of displaying the 3-dimensional image data in a manner switchable between a 3-dimensional representation and a 2-dimensional representation; an image converting means for converting, when a displayed position of the 3-dimensional image data is moving, the moving 3-dimensional image data into a 2-dimensional image data; and a control means for switching a display mode of the display means between a 3-dimensional display mode and a 2-dimensional display mode.

Herein, it is characterized in that the 3-dimensional image data previously includes a 2-dimensional select image information for selecting one viewpoint image data from a plurality of viewpoints image data, and the image converting means selects a 2-dimensional image based on the 2-dimensional select image information.

It is also characterized in the image converting means fixedly selects a predetermined single viewpoint image data as a 2-dimensional image.

It is further characterized in that the image converting means converts the 3-dimensional image data so that a plurality of viewpoints image data become identical, and displays the converted image data in the 3-dimensional display mode.

ADVANTAGE OF THE INVENTION

According to the present invention, when the displayed position of the 3-dimensional image data is changing, for example, during scrolled display of 3-dimensional image data or when a 3-dimensional motion picture is active, the control means switches the display into the 2-dimensional display mode so as to convert the 3-dimensional image into the 2-dimensional display image data and display it. Accordingly, the user is able to grasp the content easily because without any conscious control the user does not need to view the displayed image as a stereoscopic vision when the displayed image is moving.

BRIEF DESCRIPTION OF THE DRAWINGS

FIG. 1 is a functional block diagram showing a schematic configuration of an image data display apparatus in the first embodiment of the present invention.

FIG. 2 is a diagram showing a whole 3-dimensional image stored in a storage portion.

FIG. 3 is a diagram showing a 3-dimensional image decoded data configuration.

FIG. 4 is a diagram showing in detail, a 3-dimensional display control information object and an image information object contained in 3-dimensional image encoded data.

FIG. 6 is a diagram showing decoded image data that has been decoded in an image decoder and 3-dimensional image data output from a rearranger.

FIG. 7 is a diagram for illustrating the operation of the rearranger.

FIG. 11 is a diagram showing the state of the frame memory when scrolling is done in a lower right direction from the initial state.

FIG. 14 is a diagram showing 3-dimensional image data input to an image converter.

FIG. 15 is 2-dimensional image data after conversion through an image converter.

FIG. 16 is a diagram showing 3-dimensional image data input to the image converter.

FIG. 20 is a diagram showing the initial state of a frame memory.

FIG. 21 is a diagram showing the state of the frame memory when scrolling is done in a lower left direction from the initial state.

FIG. 24 is a conceptual diagram for illustrating 3-dimensional image display based on a parallax barrier scheme.

Figure 5:
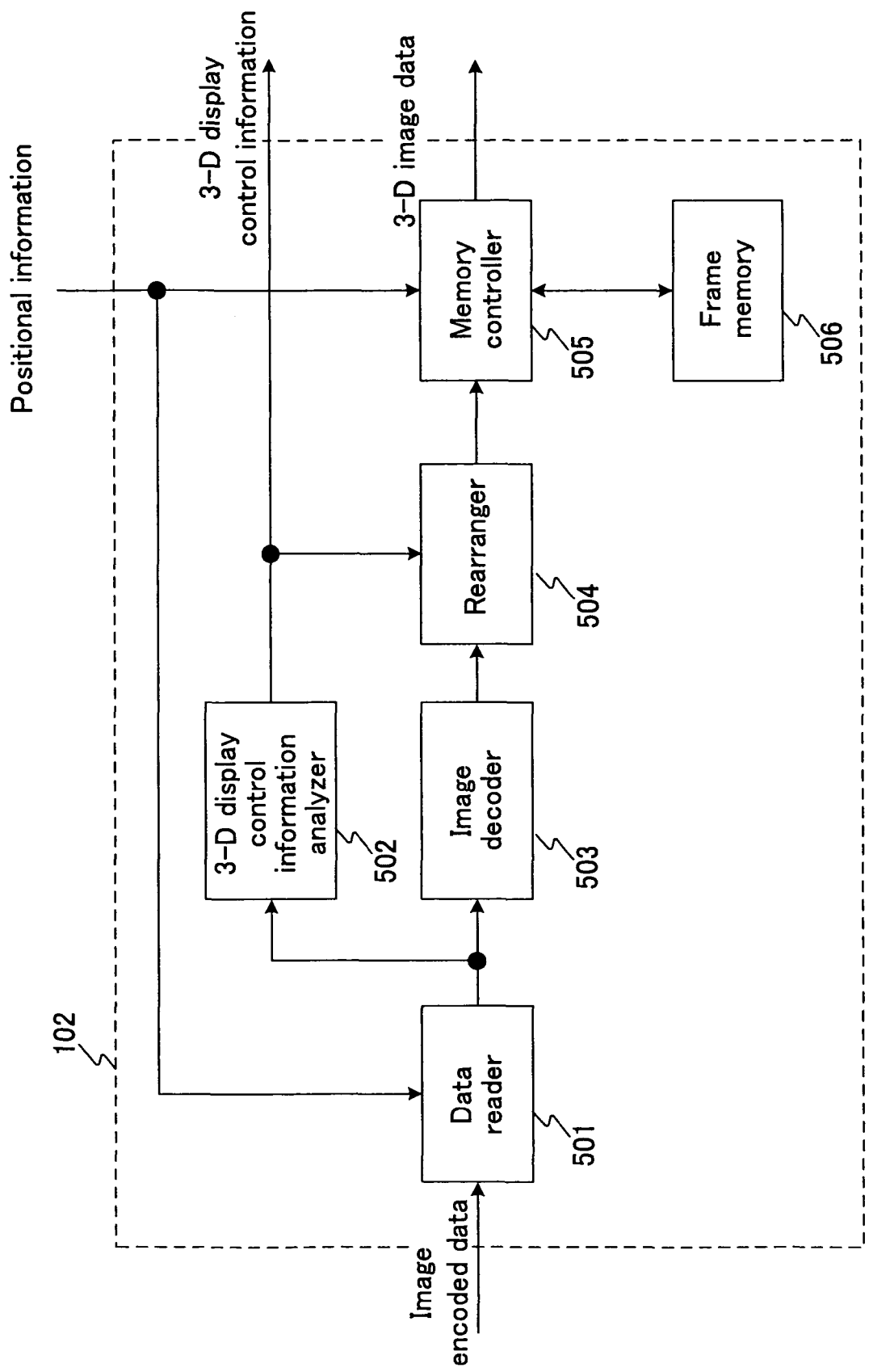
FIG. 5 is a block diagram showing an internal configuration of a decoder.

DESCRIPTION OF REFERENCE NUMERALS 101 storage portion
102 decoder
103 controller
104 display portion
301 header information object
302 3-dimensional display control information object
303 image information object
501 data reader
502 3-dimensional display control information analyzer
503 image decoder
504 rearranger
505 memory controller
506 frame memory
801 origin
901 display image area
1001 display image area
1101 display image area
1301 switch
1301A contact point A
1301B contact point B
1302 image converter
1303 display
1701 decoder
1702 display image generator
1703 display portion
1901 memory controller
1902 switch 1902A contact point A
1902B contact point B
1903 rearranger
1904 image converter
2001 display image area
2101 display image area
2201 area
2202 area
2203 area
2204 area
2401 image display panel
2402 parallax barrier
2403 left eye
2404 right eye
2501 left-eye image data
2502 right-eye image data
2503 display area
2504 area
2505 area

BEST MODE FOR CARRYING OUT THE INVENTION

Next, the embodiments of the present invention will be described with reference to the drawings. Herein, identical components in the drawings are allotted with identical reference numerals and the description will not be repeated.

The First Embodiment

FIG. 1 is a functional block diagram showing a schematic configuration of an image data display apparatus in the first embodiment of the present invention.

The image data display apparatus in the present embodiment is composed of a storage portion 101, a decoder 102, a controller 103 and a display portion 104.

Storage portion 101 includes: a recording medium on which 3-dimensional image encoded data has been recorded; a controller circuit for controlling readout of the 3-dimensional image encoded data recorded on the recording medium; and the like. As recording media, semiconductor media such as SD cards, compact flash (registered trademark) cards and the like, disc media such as CDs, DVDs and the like, hard disks and any other possible media can be used.

Decoder 102, based on the positional information of the display image, decodes the 3-dimensional image encoded data read out from storage portion 101 and outputs the decoded 3-dimensional image data to display portion 104. Herein, the positional information of the display image is information that identifies the position of the image to be displayed relative to the whole 3-dimensional image, meaning an address or the like.

Controller 103, based on the positional information of the display image, selects whether the 3-dimensional image data decoded by decoder 102 is displayed stereoscopically (in 3-dimensional display mode) or planarly (in 2-dimensional display mode) and gives notice of the display mode to display portion 104.

Display portion 104 includes a display capable of switching between 3-dimensional display mode and 2-dimensional display mode in accordance with external input, and displays the decoded 3-dimensional image data, stereoscopically or planarly on the display, in accordance with the display mode notified from controller 103. Here, it is assumed that the method of stereoscopic display in the present embodiment uses a "parallax barrier scheme".

To begin with, 3-dimensional image encoded data stored in storage portion 101 will be described with reference to FIGS. 2, 3 and 4.

FIG. 2 is a diagram showing a whole 3-dimensional image (still image) stored in storage portion 101. A whole 3-dimensional image composed of 1280 pixels×960 pixels is divided into 8×8=64 blocks of 160 pixels×120 pixels, each block containing left-eye image data and right-eye image arranged left and right. The image data of each block is encoded using JPEG compression to constitute aftermentioned 3-dimensional image encoded data with layout information (left and right) and others, and is stored in storage portion 101. The division unit of 160 pixels×120 pixels is a mere example, but the division unit should not be limited to this.

FIG. 3 is a diagram showing a 3-dimensional image decoded data configuration. The 3-dimensional image encoded data is composed of a header information object 301, a 3-dimensional display control information object 302 and image information objects 303. Here, a plurality of image information objects 303 are arranged following 3-dimensional display control information object 302, but a single integrated image information object may be used instead of those divided into plural parts.

FIG. 4 is a diagram showing in detail, 3-dimensional display control information object 302 and image information object 303 contained in 3-dimensional image encoded data.

FIG. 4(a) is a chart showing in detail, 3-dimensional display control information object 302. Three-dimensional display control information object 302 has an object unique ID (Object ID=O×12) and the whole object size (Object Size=256 byte) and 3-dimensional display control information including image layout information, sampling information and 2-dimensional select image information.

The image layout information is information that shows how image data taken from a plurality of viewpoints are arranged and is represented by (the number of viewpoints in the horizontal direction and the number of viewpoints in the vertical direction). For example, when image data taken from two viewpoints are arranged horizontally (left and right), the image layout information is represented as (2,1). When arranged vertically (top and bottom), the image layout information is represented as (1,2).

The sampling information indicates the sampling ratios in the horizontal direction and in the vertical direction for image data from each viewpoint, and is represented by (the sampling ratio in the horizontal direction, the sampling ratio in the vertical direction). For example, when sampling is performed with its resolution in the horizontal direction alone reduced to ½, the sampling information is given as (½, 1). When sampling is performed with its resolution in the vertical direction alone reduced to ½, the sampling information is given as (1, ½). In the present embodiment, the sampling information is used to adjust the image aspect ratio when image data from individual viewpoints are displayed on a 3-dimensional display based on parallax barrier. Other than the aspect ratio, it is also possible to determine the reduction ratio to the original image data (the image data before sampling) from the sampling information. However, this embodiment does not use any of this information in particular.

The 2-dimensional select image information is information for selecting one image data from the image data taken from a plurality of viewpoints, and given as 2-dimensional select image information=(viewpoint number in the horizontal direction, the viewpoint number in the vertical direction). For example, when the image data on the left side is selected from the image data taken from two viewpoints, which are arranged horizontally (left and right), namely represented with (image layout information=(2,1)), the 2-dimensional select image information is given as (1,1). Similarly, when the image data on the right side is selected, the 2-dimensional select image information is given as (2,1).

In the present embodiment, image layout information is given as (2,1), sampling information as (½, 1) and 2-dimensional select image information as (1,1).

FIG. 4(b) is a chart showing the detail of image information object 303. Image information object 303 stores an object unique ID (Object ID=O×13), the whole object size (Object Size=20480 byte) and JPEG compressed data as the encoded data.

Next, the operation of decoder 102 will be described in detail.

FIG. 5 is a block diagram showing the internal configuration of decoder 102. Decoder 102 is composed of a data reader 501, a 3-dimensional display control information analyzer 502, an image decoder 503, a rearranger 504, a memory controller 505 and a frame memory 506.

Data reader 501 reads out 3-dimensional image encoded data from storage portion 101 in accordance with the positional information of the display image, and separates individual objects contained in the 3-dimensional image encoded data. Specifically, header information object 301 of the read out 3-dimensional image encoded data is analyzed so as to determine the classifications of the objects following header information object 301. Then, the 3-dimensional image encoded data is separated with reference to their Object IDs, specifically, by transferring objects to 3-dimensional display control information analyzer 502 for Object ID=O×12, to image decoder 503 for Object ID=O×13.

Three-dimensional display control information analyzer 502 analyzes the 3-dimensional display control information object 302 sent from data reader 501 and outputs image layout information, sampling information and 2-dimensional select image information, as 3-dimensional display control information. In this case, the image layout information is output as (2,1), which represents that the image data from two viewpoints are arranged horizontally (left and right), the sampling information as (½,1), which represents that only the horizontal resolution is ½, and the 2-dimensional select image information as (1,1), which represents that the image data from the left viewpoint is selected when one viewpoint image data is to be selected.

Image decoder 503 analyzes the image information object 303 sent from data reader 501, performs a decoding process of the JPEG compressed data contained in the object and outputs the decoded image data to rearranger 504.

FIG. 6 is a diagram showing the decoded image data that has been decoded in image decoder 503 (FIG. 6(a)) and the 3-dimensional image data output from rearranger 504 (FIG. 6(b)).

As analyzed at 3-dimensional display control information analyzer 502, the decoded image data that was decoded at image decoder 503 has a structure in which left-eye image data and right-eye image data that have been sampled with their horizontal resolution reduced to ½ are arranged left and right.

FIG. 7 is a diagram for illustrating the operation of rearranger 504. First, rearranger 504 divides the decoded image data into strips of data as shown in FIG. 7(a). Then, the left-eye image data and right-eye image data are rearranged such that the divided strips of left-eye image data, L1, L2, L3 . . . and the strips of right-eye image data R1, R2, R3 . . . are positioned in an alternate manner as L1, R1, L2, R2, L3, R3 . . . (FIG. 7(b)). As a result, the 3-dimensional image data shown in FIG. 6(b) is obtained so as to be able to display a correct stereoscopic vision on a 3-dimensional display based on the parallax barrier scheme.

Memory controller 505 and frame memory 506 will be described with reference to FIGS. 8, 9, 10, 11 and 12.

Figure 8:
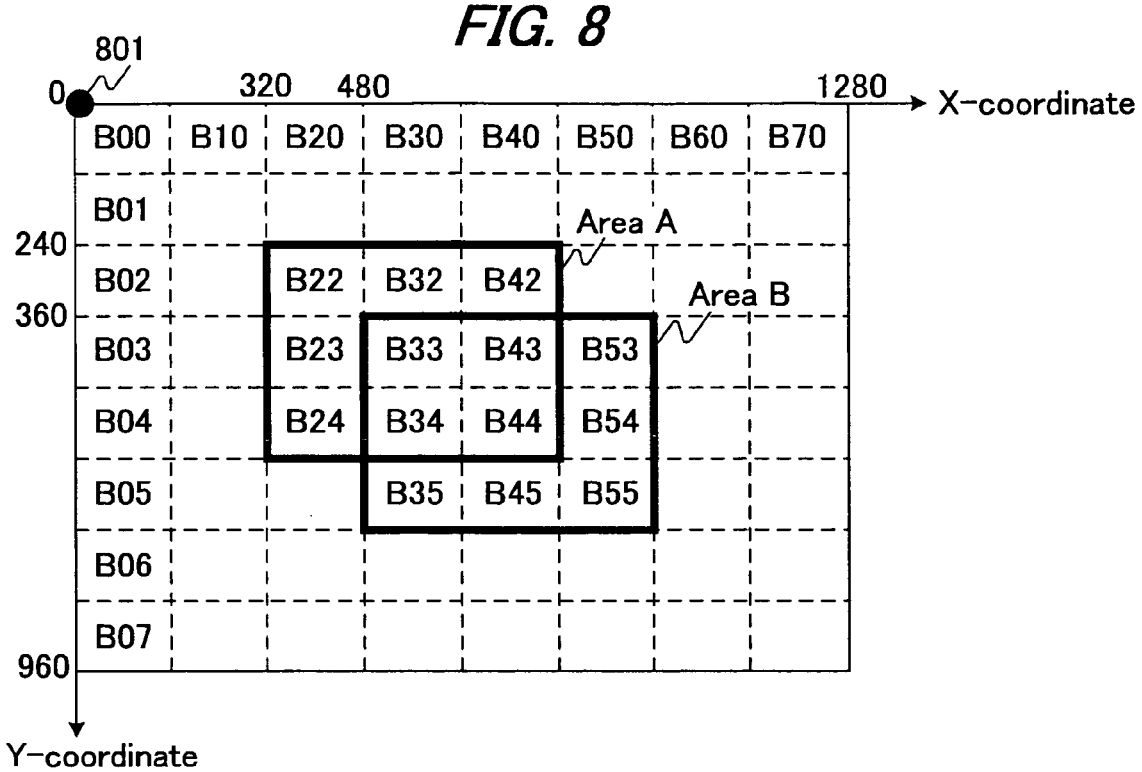
FIG. 8 is a diagram showing the whole 3-dimensional image stored in the storage portion.

FIG. 8 is a diagram showing a whole 3-dimensional image stored in storage portion 101. As already described, the whole 3-dimensional image made up of 1280 pixels×960 pixels is divided into blocks of 160 pixels×120 pixels. Here, it is assumed that the top left of the 3-dimensional image is the origin 801 and the horizontal direction is denoted by X-coordinates and the vertical direction is denoted by Y-coordinates. It is also assumed that a block located at the i-th block (i=0, 1, 2, . . . ) from origin 801 in the horizontal direction and the j-th block (j=0, 1, 2, . . . ) from origin 801 in vertical direction is called Bij (partly abbreviated in FIG. 8).

Frame memory 506 is a memory for temporarily holding the decoded 3-dimensional image data output from rearranger 504 and can hold nine blocks of 3-dimensional image data. For example, in FIG. 8 an area A (area consisting of block B22, block B32, block B42, block B23, block B33, block B43, block B24, block B34 and block B44) or area B (area consisting of block B33, block B43, block B53, block B34, block B44, block B54, block B35, block B45 and block B55) can be held. In this case, the coordinate at the top left (top left in block B22) in area A is (320, 240) and the coordinate at the top left (top left in block B33) in area B is (480, 360).

Memory controller 505 writes the 3-dimensional image data that has been rearranged at rearranger 504 into frame memory 506, and reads out the 3-dimensional image data to be displayed on the display from frame memory 506 and outputs its. Memory controller 505 also controls the positional information that represents which part in the whole 3-dimensional image is held in frame memory 506 and controls the positional information that indicates which part of the 3-dimensional image data held in frame memory 506 should be displayed on the display. In the present embodiment, of these two positional information, the former will be called base address and the latter is called display offset.

Figure 9:
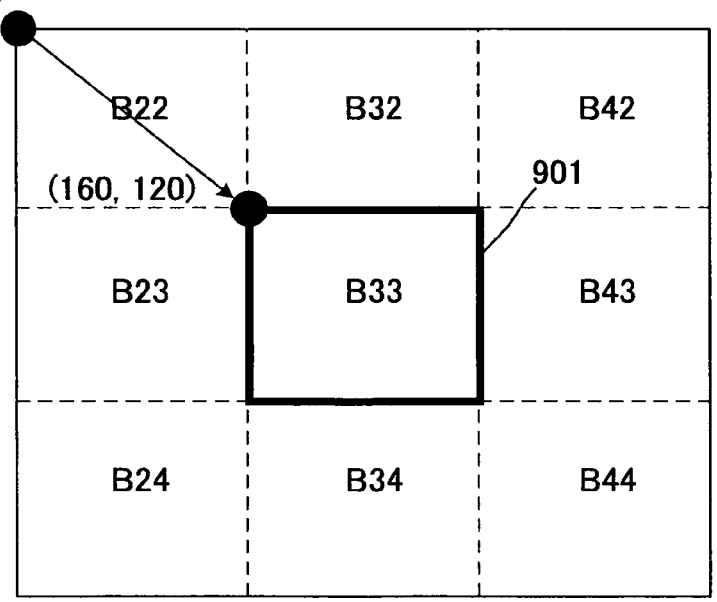
FIG. 9 is a diagram showing the initial state of a frame memory.

FIG. 9 is a diagram showing the initial state of frame memory 506. Block B33 in FIG. 8 is selected as a display image area 901, and the 3-dimensional image data on this block and its surrounding eight blocks (block B22, block B32, block B42, block B23, block B33, block B43, block B24, block B34 and block B44), nine block in total, is stored in frame memory 506. Upon this, memory controller 505 holds as the base address, the starting address of the 3-dimensional image data stored in the frame memory, i.e., the starting address (320, 240) of block B22, and also holds as the display offset an offset (160, 120) from the base address, as indicated with an arrow in FIG. 9.

Though it is assumed herein that the size of display image area 901 and that of the divided block are equal, the embodiment should not be limited to this and can be applied in the same manner to a configuration in which they are different in size.

Figure 10:
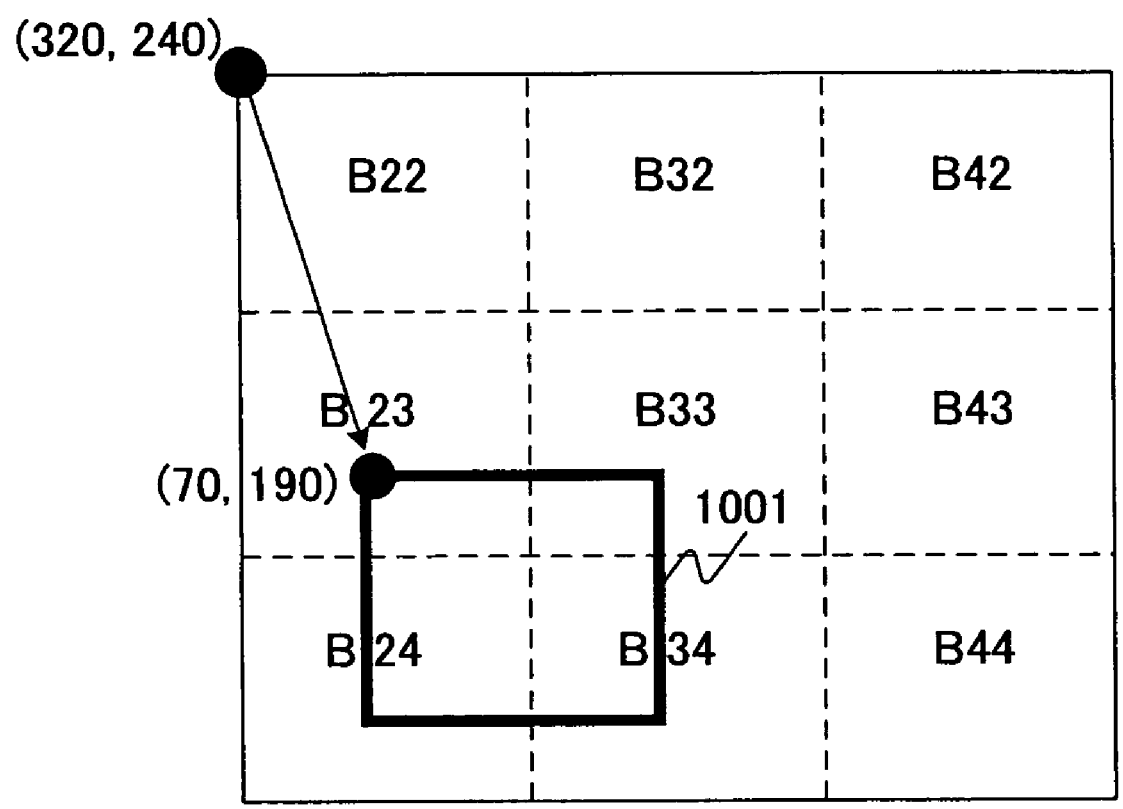
FIG. 10 is a diagram showing the state of the frame memory when scrolling is done in a lower left direction from the initial state.

FIG. 10 is a diagram showing the state of frame memory 506 when scrolling is done in a lower left direction from the initial state (FIG. 9).

Similarly to the initial state, frame memory 506 stores the 3-dimensional image data of block B22, block B32, block B42, block B23, block B33, block B43, block B24, block B34 and block B44 while the base address is (320, 240) and the display offset that indicates a display image area 1001 is set at (70, 190).

As in the above way, when display image area 1001 does not yet reach the boundary of frame memory 506, in other words, when the display area can be scrolled in any direction, vertically and horizontally in frame memory 506, the content in frame memory 506 and the base address will not be renewed and the display offset alone is renewed.

FIG. 11(a) is a diagram showing the state of frame memory 506 when scrolling is done in a lower right direction from the initial state (FIG. 9).

Similarly to the initial state, frame memory 506 stores the 3-dimensional image data of block B22, block B32, block B42, block B23, block B33, block B43, block B24, block B34 and block B44 while the base address is (320, 240) and the display offset that indicates a display image area 1101 is set at (320, 240). The different point from FIG. 10 is that display image area 1101 overlaps the boundary of frame memory 506. In this case, the display area can be further scrolled upwards and leftwards, but can not be scrolled rightwards and downwards if nothing is done because there is no decoded 3-dimensional image data. Therefore, frame memory 506, the base address and the display offset will be renewed.

Alternatively, it is possible to provide a configuration in which an area 1102 indicated by hatching that is smaller than the area of frame memory 506 is defined as shown in FIG. 11(b), and frame memory 506, the base address and the display offset will not be renewed when display image area 1101 is moved inside area 1102; and frame memory 506, the base address and the display offset can be renewed when display image area 1101 reaches the boundary of area 1102.

Figure 12:
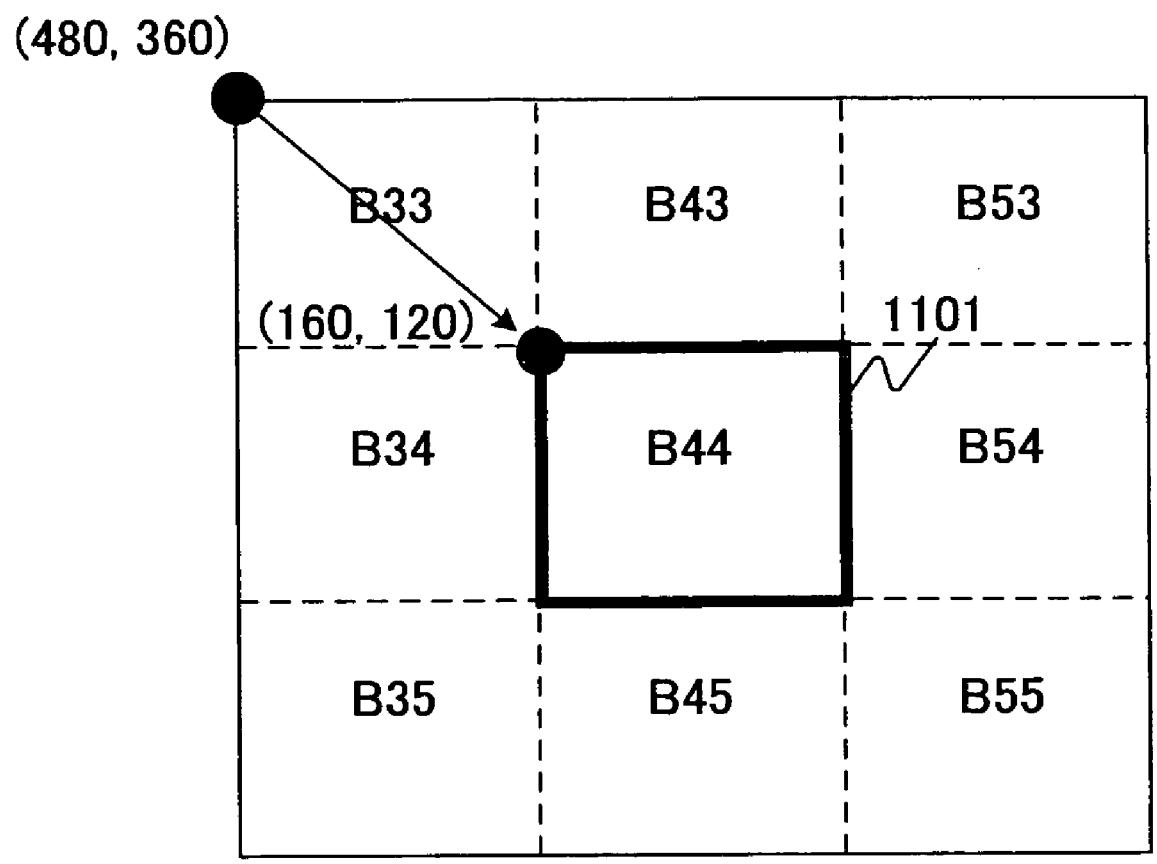
FIG. 12 is a diagram showing a renewed state of the frame memory.

FIG. 12 is a diagram showing a renewed state of frame memory 506.

In frame memory 506, the 3-dimensional image data on nine blocks (block B33, block B43, block B53, block B34, block B44, block B54, block B35, block B45 and block B55) centered by block B44 corresponding to display image area 1101 is stored. The base address is renewed with the starting address (480, 360) of B33 and the display offset is renewed with (160, 120).

When the content in frame memory 506 is renewed, basically, the 3-dimensional image encoded data of the corresponding blocks is newly read out by data reader 501 and decoded by image decoder 503 and rearranger 504, then the 3-dimensional image data is written into frame memory 506 by means of memory controller 505.

However, in the example described above, of the nine blocks, four blocks, namely, block B33, block B43, block B34 and block B44 have been already decoded and only their positions of storage in frame memory 506 have changed. Accordingly, for these blocks having been decoded, the already decoded 3-dimensional image data may be duplicated inside frame memory 506 by means of memory controller 505 without performing a decoding process once again. Alternatively, it is also possible to perform control of blocks by preparing a table for presenting the displayed positions (display offset etc.) of nine blocks separately and changing the associated values in the table for the blocks whose storage positions have been changed. For example, the only thing that is needed for block B44 is to alter the associated display offset in the table from (320, 240) to (160, 120). Similarly, for block B33, the only thing needed is to alter the associated display offset in the table from (160, 120) to (0, 0).

Next, the operation of controller 103 will be described in detail.

Controller 103, based on the positional information on the display image, selects whether the 3-dimensional image data decoded by decoder 102 is displayed stereoscopically (in 3-dimensional display mode) or planarly (in 2-dimensional display mode), and gives a notice of the display mode to display portion 104. Specifically, the input positional information=display address is monitored, and if no temporal change occurs, namely if the displayed position of the image data does not change, 3-dimensional display mode is selected as the display mode. On the other hand, if there is a temporal change, namely if the displayed position of the image data varies by scrolling, 2-dimensional display mode is selected as the display mode.

Alternately, it is also possible to provide a configuration in which, with a predetermined threshold defined, if the ratio of the variation of the positional information is not more than the threshold, more explicitly, when scrolling is done slowly, 3-dimensional display mode is selected as the display mode and when scrolling is done faster than the threshold, namely at a relatively high speed, 2-dimensional display mode is selected as the display mode.

Next, the operation of display portion 104 will be described in detail.

Figure 13:
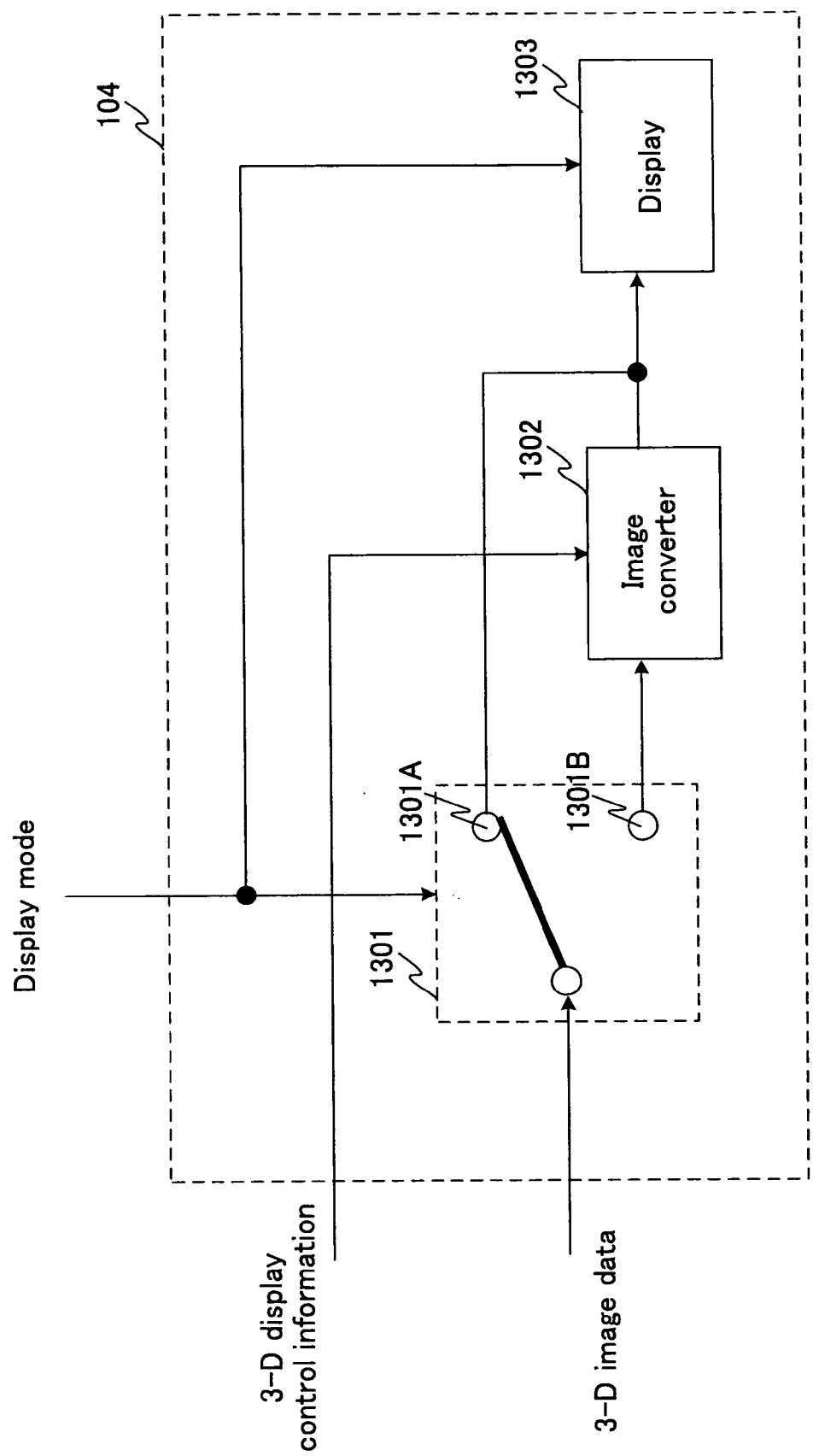
FIG. 13 is a block diagram showing an internal configuration of a display portion.

FIG. 13 is a block diagram showing the internal configuration of display portion 104. Display portion 104 is composed of a switch 1301, a contact point 1301A, a contact point 1301B, an image converter 1302 and display 1303.

Input to display portion 104 are the display mode (3-dimensional display mode/2-dimensional display mode) notified from controller 103, 3-dimensional display control information as the output from decoder 102 and 3-dimensional image data.

When the display mode is 3-dimensional display mode, switch 1301 is connected to contact point 1301A, so that 3-dimensional image data is stereoscopically displayed as a 3-dimensional image on display 1303.

When the display mode is 2-dimensional display mode, switch 1301 is connected to contact point 1301B, and the 3-dimensional image data is converted by image converter 1302 to 2-dimensional image data, which is displayed as a 2-dimensional image on display 1303.

Image converter 1302 converts 3-dimensional image data into 2-dimensional image data based on the 3-dimensional display control information. The operation of image converter 1302 will be described with reference to FIGS. 14 and 15. FIG. 14 shows the 3-dimensional image data input to image converter 1302, where strips of left-eye image data and right-eye image data are arranged alternately in the order of L1, R1, L2, R2, L3 and R3. In image converter 1302, first, based on image layout information=(2,1) contained in the 3-dimensional display control information, either the left-eye image data or the right-eye image data is selected from the 3-dimensional image data and extracted. Then, using the sampling information=(½, 1) contained in the 3-dimensional display control information, the resolution is converted.

FIG. 15 is a diagram showing 2-dimensional image data after conversion through image converter 1302. FIG. 15(a) shows an output image when the left-eye image data is selected, and FIG. 15(b) shows an output image data when the right-eye image data is selected. The 2-dimensional image data shown in FIG. 15(a) or FIG. 15(b) is displayed as a 2-dimensional image on display 1303.

Here, whether the left-eye image data or the right-eye image data should be selected may be determined, based on the 2-dimensional select image information of 3-dimensional display control information, or in a fixed manner such as always extracting the left-eye image data or the like.

Further, though the input to display portion 104 was assumed to be the data having strips of image data at different viewpoints arranged alternately in the order of L1, R1, L2, R2, L3 and R3 from left as shown in FIG. 14, there is also a case where strips of image data at different viewpoints are arranged alternately in the order of R1, L1, R2, L2, R3 and L3 from left as shown in FIG. 16. For example, when the left-eye image data is extracted, strips located at odd-numbered (first, third, fifth) positions from left are picked up for the former case (FIG. 14) while strips located at even-numbered (second, fourth, sixth) positions from left are picked up for the latter case (FIG. 16). That is, the positions of extraction are different. This occurs due to the fact that the scrolling is done in pixel units. Instead, it is possible to add a limitation that the scrolling should be done in units of an integer multiple of the number of viewpoints. As a result, the input to display portion 104 is limited to the image data having a format shown in FIG. 14, so that it is possible to simplify the process at image converter 1302 as well as to prevent the left-eye image data and the right-eye image data from being inverted when a viewpoint image data is extracted.

In the case of the present embodiment, since there are two viewpoints in horizontal direction, the process can be simplified by setting the scrolling unit in the horizontal direction to be an integer multiple of 2.

The Second Embodiment

Next, an image data display apparatus in the second embodiment of the present invention will be described.

Figure 17:
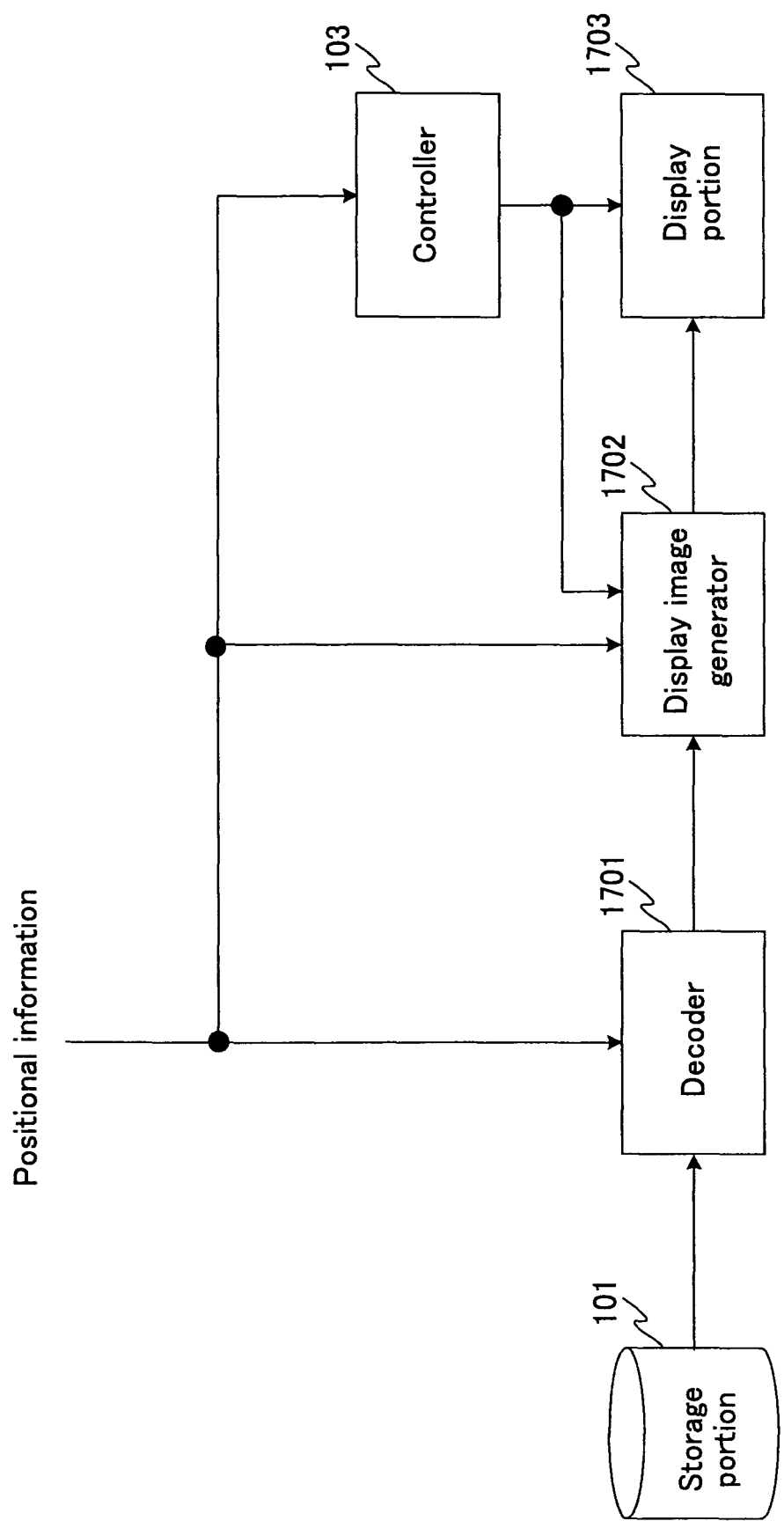
FIG. 17 is a functional block diagram showing a schematic configuration of an image data display apparatus in the second embodiment of the present invention.

FIG. 17 is a functional block diagram showing a schematic configuration of the image data display apparatus in the second embodiment of the present invention.

The image data display apparatus in the present embodiment is composed of a storage portion 101, a decoder 1701, a controller 103, a display image generator 1702 and a display portion 1703.

Storage portion 101 has a configuration similar to the first embodiment, including: a recording medium on which 3-dimensional image encoded data has been recorded; a controller circuit for controlling readout of 3-dimensional image encoded data recorded on the recording medium; and the like.

Decoder 1701, based on the positional information of the display image, decodes the 3-dimensional image encoded data read out from storage portion 101 and outputs the decoded 3-dimensional image data to display image generator 1702.

Controller 103 is similar to the first embodiment, and selects whether the 3-dimensional image data decoded by decoder 1701 is displayed stereoscopically (in 3-dimensional display mode) or planarly (in 2-dimensional display mode), based on the positional information of the display image and gives notice of the display mode to display image generator 1702 and display portion 1703.

Display image generator 1702, in accordance with the display mode notified by controller 103, generates image data displayable on display portion 1703 from the 3-dimensional image data decoded by decoder 1701 and outputs it.

Display portion 1703 is a display capable of switching between 3-dimensional display mode and 2-dimensional display mode in accordance with external input, and displays the decoded 3-dimensional image data on the display, stereoscopically or planarly, in accordance with the display mode notified from controller 103. Here, it is assumed that the method of stereoscopic display in the present embodiment uses a "parallax barrier scheme".

Here, storage portion 101 and controller 103 are the same as those in the first embodiment, so detailed description is omitted.

Figure 18:
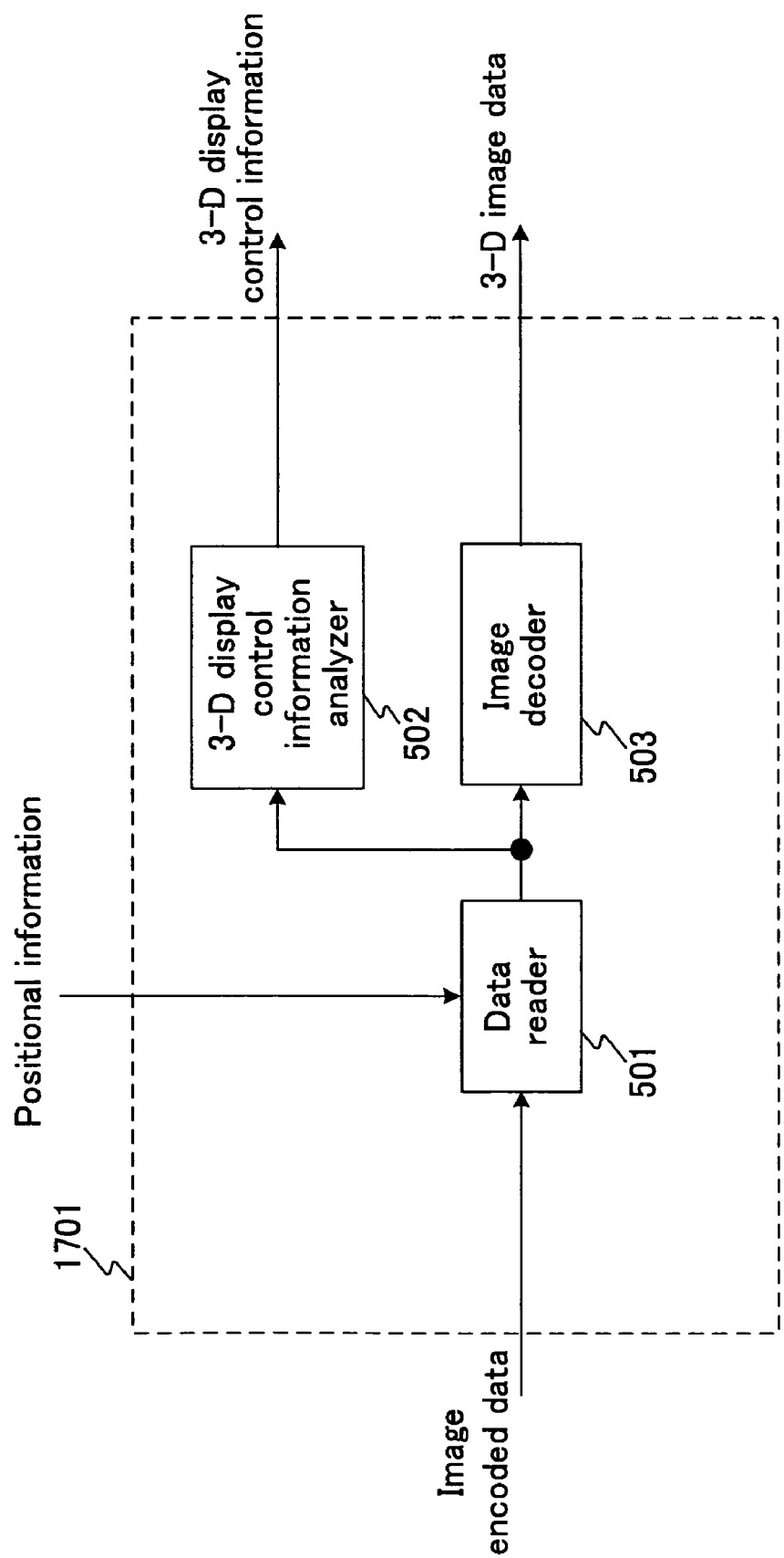
FIG. 18 is a block diagram showing an internal configuration of a decoder.

First, the operation of decoder 1701 will be described in detail. FIG. 18 is a block diagram showing the internal configuration of decoder 1701. Decoder 1701 is composed of a data reader 501, a 3-dimensional display control information analyzer 502, an image decoder 503.

Data reader 501 reads out 3-dimensional image encoded data from storage portion 101 in accordance with the positional information of the display image, and separates individual objects contained in the 3-dimensional image encoded data.

Three-dimensional display control information analyzer 502 analyzes the 3-dimensional display control information object 302 sent from data reader 501 and outputs image layout information, sampling information and 2-dimensional select image information, as 3-dimensional display control information. In this case, similarly to the first embodiment, the image layout information is output as (2,1), which represents that the image data from two viewpoints are arranged horizontally (left and right), the sampling information as (½,1), which represents that only the horizontal resolution is ½, and the 2-dimensional select image information as (1,1), which represents that the image data from the left viewpoint is selected when one viewpoint image data is to be selected.

Image decoder 503 analyzes the image information object 303 sent from data reader 501, performs a decoding process of the JPEG compressed data contained in the object and outputs the decoded image data. Herein, image data formed of the left-eye image data and the right-eye image data arranged left and right as shown in FIG. 6(a) is output.

Next, the operation of display image generator 1702 will be described in detail.

Figure 19:
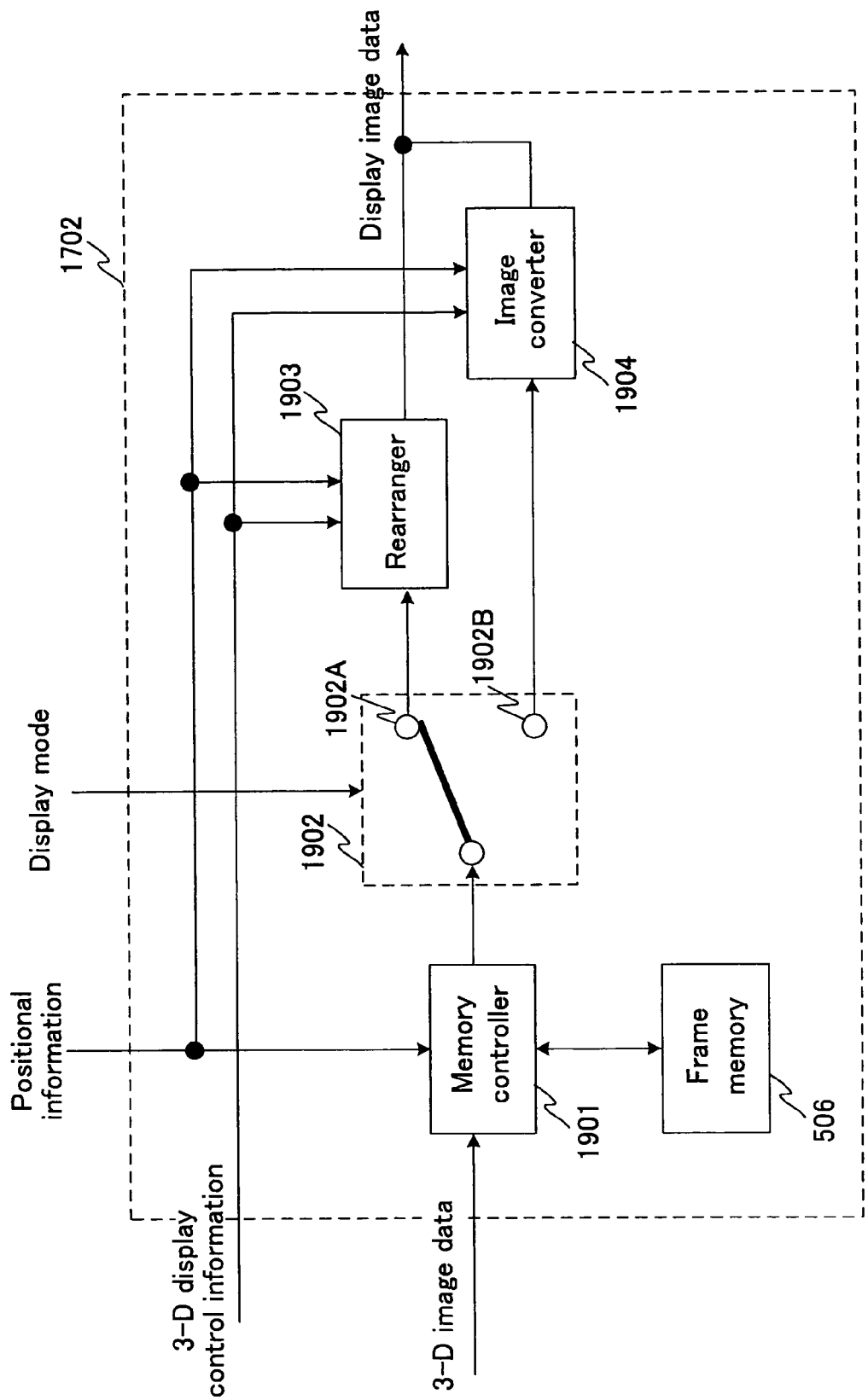
FIG. 19 is a block diagram showing an internal configuration of a display image generator.

FIG. 19 is a block diagram showing the internal configuration of display image generator 1702. Display image generator 1702 is composed of a memory controller 1901, a frame memory 506, a switch 1902, a rearranger 1903 and an image converter 1904.

Similarly to the first embodiment, storage portion 101 holds a whole 3-dimensional image, which is divided into blocks of 160 pixels×120 pixels, each block being encoded individually, as shown in FIG. 8.

Frame memory 506 is a memory for temporarily storing the 3-dimensional image data which has been decoded and output from decoder 1701. Similarly to the first embodiment, the memory is able to hold nine blocks. Memory controller 1901 writes the 3-dimensional image data decoded by decoder 1701 into frame memory 506 and reads out one block or a plurality of blocks of 3-dimensional image data necessary for display from frame memory 506 and outputs it.

FIG. 20 is a diagram showing the initial state of frame memory 506. Block B33 in FIG. 8 is selected as a display image area 2001, and the 3-dimensional image data on this block and its surrounding eight blocks (block B22, block B32, block B42, block B23, block B33, block B43, block B24, block B34 and block B44), nine blocks in total, is stored in frame memory 506. Though in the first embodiment, the data is stored such that each block is rearranged as a 3-dimensional image data with a format (FIG. 6(b) or FIG. 7(b)) that is displayable on a parallax barrier scheme display, in the present embodiment, the data is stored such that each block is arranged in a format (FIG. 6(a) or FIG. 7(a)) having the left-eye image data and the right-eye image data arranged left and right. This is the different point.

When the display mode input from controller 103 is 3-dimensional display mode, switch 1902 is connected to a contact point 1902A, so that the 3-dimensional image data supplied from memory controller 1901 is input to rearranger 1903. On the other hand, when the display mode is 2-dimensional display mode, switch 1902 is connected to a contact point 1902B so that the 3-dimensional image data is input to image converter 1904.

Rearranger 1903, based on the 3-dimensional display control information, positional information and one block or a plurality of blocks of 3-dimensional image data supplied from memory controller 1901, rearranges the 3-dimensional image data for the displayed position in the 3-dimensional display mode, namely in a format (FIG. 6(*b*) or FIG. 7(*b*)) displayable on the parallax barrier scheme 3-dimensional display, and outputs it as the display image data.

Image converter 1904, based on the 3-dimensional display control information, positional information and one block or a plurality of blocks of 3-dimensional image data supplied from memory controller 1901, converts the 3-dimensional image data for the displayed position into image data having a format (FIG. 15(*a*), FIG. 15(*b*) or the like) displayable in 2-dimensional display mode and outputs it as the display image data. The method of conversion is not limited to the converting method shown in FIG. 15, but it is also possible to create, based on L1, L2 and L3 in FIG. 14, interpolated images L1' (created from L1 and L2), L2' (created from L2 and L3), L3' (created from L3 and L4 (the image data in the neighboring block on the right)) and output L1, L1', L2, L2', L3 and L3' as the display image data.

Referring next to FIGS. 20 and 21, the operation of display image generator 1702 will be briefly described.

When frame memory 506 is in the initial state (FIG. 20), display image area 2001=divided block B33, hence memory controller 1901 reads out block B33 alone from frame memory 506 and outputs it.

When the display mode is 3-dimensional display mode, switch 1902 is connected to contact point 1902A, so that the read out 3-dimensional image data of block B33 is input to rearranger 1903. Rearranger 1903, based on 3-dimensional display control information, rearranges the data from the format shown in FIG. 7(*a*) to that in FIG. 7(*b*) and outputs it to display portion 1703. In this case, the operation of rearranger 1903 is the same as that of rearranger 504 in the first embodiment.

When the display mode is 2-dimensional display mode, switch 1902 is connected to contact point 1902B, so that the read out 3-dimensional image data of block B33 is input to image converter 1904. Image converter 1904, based on 3-dimensional display control information, converts the data into the format shown in FIG. 15(*a*) or that in FIG. 15(*b*) and outputs it to display portion 1703. In this case, the operation of image converter 1904 is the same as that of rearranger 1302 in the first embodiment.

FIG. 21 is a diagram showing the state of frame memory 506 when scrolling is done in a lower left direction from the initial state (FIG. 20). Since a display image area 2101 extends over a plurality of divided blocks (block B23, block B33, block B24 and block B34), memory controller 1901 reads out these four blocks from frame memory 506 and output them.

Figure 22:
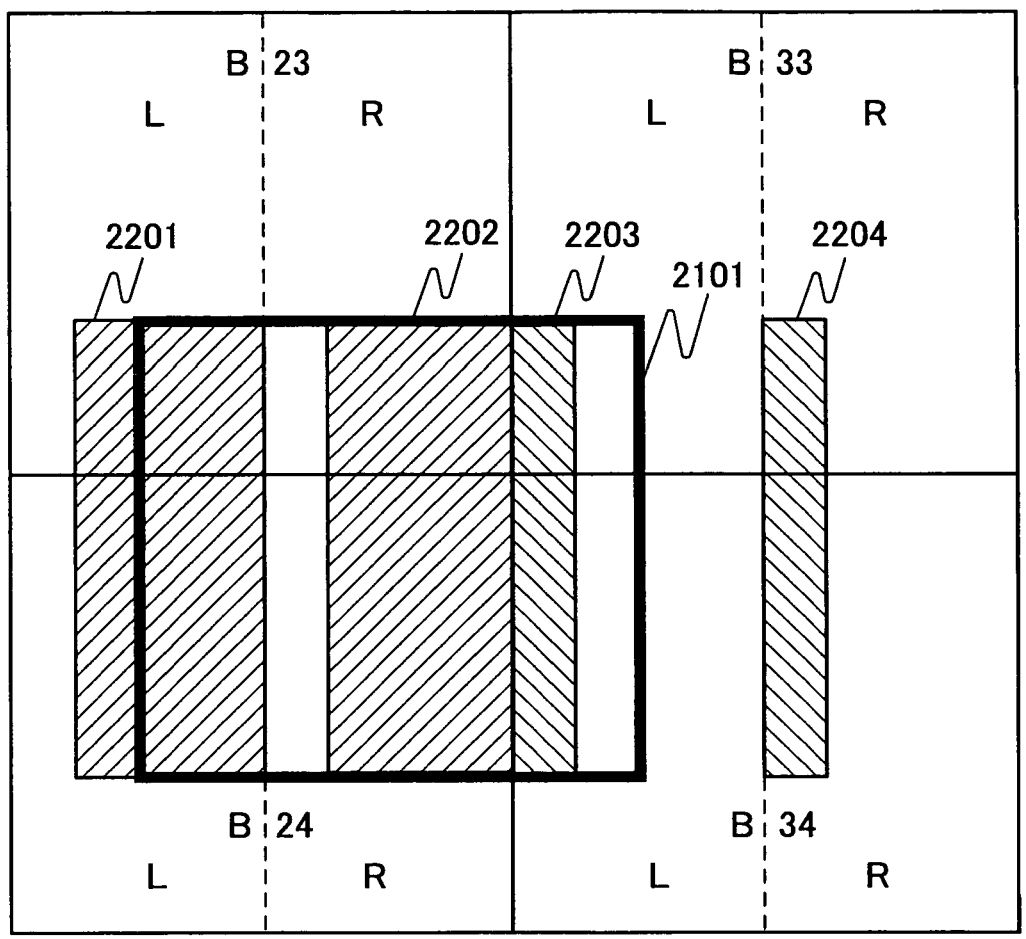
FIG. 22 is a diagram showing the state of the frame memory when scrolling is done in a lower left direction from the initial state.
Figure 23:
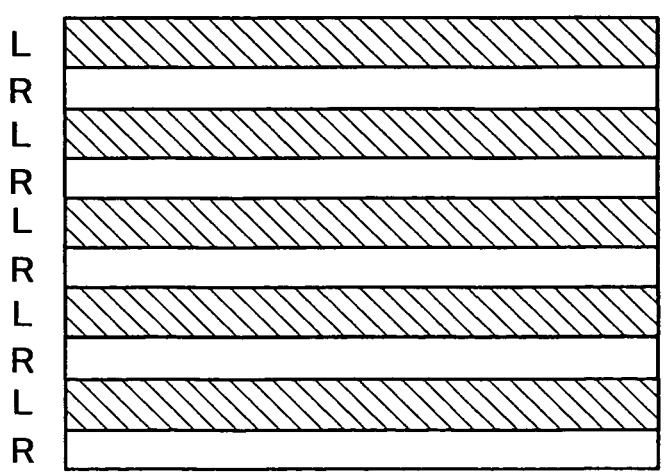
FIG. 23 is a conceptual diagram for illustrating 3-dimensional image display based on a time-division scheme.

When the display mode is 3-dimensional display mode, switch 1902 is connected to contact point 1902A, so that the read out four blocks of 3-dimensional image data are input to rearranger 1903. Rearranger 1903, based on the positional information and 3-dimensional display control information, rearranges the data in the format of FIG. 7(*b*) that is displayable on the parallax barrier scheme display. Upon this, once all the four blocks are rearranged in the format of FIG. 7(*b*), then the image data corresponding to display image area 2101 may be cut out to be output to display portion 1703. That is, rearrangement may be done for the necessary area only. For example, when, as in the present embodiment, the left-eye image data and the right-eye image data are arranged left and right, only the part of the image data that is located at the left and right of display image area 2101 is needed while the image data that is located above and below is not needed, therefore the process can be simplified. FIG. 22 is an enlarged view showing part of block 23, block 33, block 24 and block 34 in FIG. 21. In order to display the image data corresponding to display image area 2101, areas 2201 and 2203 indicated by hatching for the left-eye image data and areas 2202 and 2204 for the right-eye image data are needed.

When the display mode is 2-dimensional display mode, switch 1902 is connected to contact point 1902B, so that the read out four blocks of 3-dimensional image data are input to image converter 1904. Image converter 1904, based on the positional information and 3-dimensional display control information, rearranges the data into the format of FIG. 15(*a*) or FIG. 15(*b*). Upon this, once all the four blocks are converted, then the image data corresponding to display image area 2101 may be cut out to be output to display portion 1703. That is, conversion may be done for the necessary area only. For example, when, as in the present embodiment, the left-eye image data and the right-eye image data are arranged left and right, only the part of the image data that is located at the left and right of display image area 2101 is needed while the image data that is located above and below is not needed, therefore the process can be simplified. Also in this case, areas 2201 to 2204 in FIG. 22 are needed. Alternatively, if which the left-eye image data or the right-eye image data is used as the image data to be displayed when in 2-dimensional display mode is known, the process can be further simplified. For example, areas 2201 and 2203 are needed for the left-eye image data, whereas only areas 2202 and 2204 are needed for the right-eye image data.

Up to now, the first and second embodiments have been described. Though the image data display apparatus according to the present embodiments is constructed such that when the image data is displayed as a 2-dimensional image, display portion 104 or display portion 1703 is switched into 2-dimensional display mode, 2-dimensional representation can be realized in 3-dimensional display mode by making the left-eye image data and the right-eye image data identical with each other.

Further, the image data display apparatus in the present embodiment was described taking an example of 3-dimensional image data made up of two viewpoint image data, but the apparatus can be applied in the same manner to the case where 3-dimensional image data is made up of image data from three or more viewpoints.

Moreover, though the image data display apparatus in the present embodiment was described taking an example in which 3-dimensional still image data is scrolled, the apparatus is not limited to still image data and can be applied in the same manner to the case of motion picture data. In the case of motion picture data, it is possible to provide a configuration where, in addition to scrolled display, the degree of motion is detected so that the data is converted into 2-dimensional image data when an active motion is detected, so as to present 2-dimensional display instead of 3-dimensional display. Concerning motion detection, if the encoded data is one that is compressed using MPEG-4 or the H.263 standard, motion can be detected by making use of the values of motion vectors involved in the encoded data, for example. When an image in which part of the frame of display can be scrolled (for example, the frame of display for a 3D game or the like) is handled, it is also possible to present 2-dimensional display only for the part that is given as scrolled display.

Also, image decoder 503 of the present embodiment was constructed so that decoding of divided blocks is implemented in a time-division manner, but it is also possible to execute decoding of a plurality of blocks in parallel by providing a plurality (as many as the blocks that can be stored in frame memory 506, for example) of image decoders.

Figure 25:
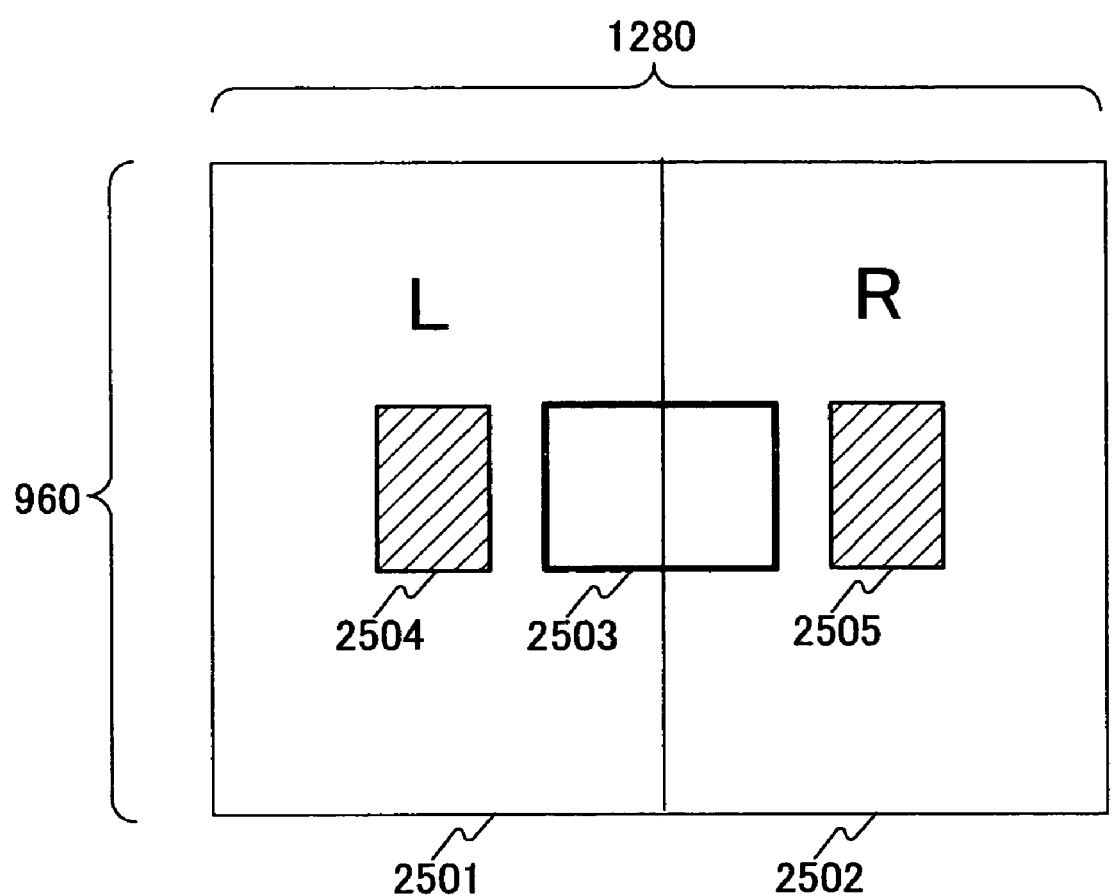
FIG. 25 is a diagram showing a conventional 3-dimensional image data configuration.

Further, the present embodiment was described taking an example in which 3-dimensional image data of a whole image that is divided into a plurality of blocks each consisting of left-eye image data and right-eye image data as shown in FIG. 2 is displayed and scrolled, but the present invention can also be applied to a configuration in which a whole image is composed of a single left-eye image data and a single right-eye image data as shown in FIG. 25, instead of being divided into the plurality of blocks. In this case, only the portions (area 2504 for left-eye image data and area 2505 for right-eye image data) corresponding to a display area 2503 (the center portion in the whole image) may be decoded to give display of 3-dimensional image data or 2-dimensional image data. Alternatively, the whole image may be once decoded and then the display areas may be cut out so as to present display of 3-dimensional image data or 2-dimensional image data.

Moreover, though the image data display apparatus in the present embodiment is constructed such that 3-dimensional image encoded data recorded on a recording medium is read out and displayed after decoding of the read out 3-dimensional image encoded data, the present invention can also be applied in the same manner to a configuration in which 3-dimensional image data having been decoded by external means is received via a wired or wireless connection and displayed.

The invention claimed is:

1. An image data display apparatus capable of switching a display of an input 3-dimensional image data between a stereoscopic representation or a planar representation, comprising:
a display means capable of displaying the 3-dimensional image data in a manner switchable between a 3-dimensional representation and a 2-dimensional representation;
an image converting means for converting, when a displayed position of the 3-dimensional image data is moving, the moving 3-dimensional image data into a 2-dimensional image data; and
a control means for switching a display mode of the display means between a 3-dimensional display mode and a 2-dimensional display mode,
wherein when part of a 3-dimensional image displayed on the display means is moving,
the image converting means only converts a 3-dimensional image data of the moving part into a 2-dimensional image data, and
the control means only switches the 3-dimensional display mode of the moving part to the 2-dimensional display mode.

2. The image data display apparatus according to claim 1, wherein the 3-dimensional image data previously includes a 2-dimensional select image information for selecting one viewpoint image data from a plurality of viewpoints image data, and the image converting means selects a 2-dimensional image based on the 2-dimensional select image information.

3. The image data display apparatus according to claim 1, wherein the image converting means selects a predetermined single viewpoint image data as a 2-dimensional image.

4. The image data display apparatus according to claim 1, wherein the image converting means converts the 3-dimensional image data so that a plurality of viewpoints image data become identical, and displays the converted image data in the 3-dimensional display mode.

5. An image data display apparatus capable of switching a display of an input 3-dimensional image data between a stereoscopic representation or a planar representation, comprising:
a display capable of displaying the 3-dimensional image data in a manner switchable between a 3-dimensional representation and a 2-dimensional representation;
an image converter converting the moving 3-dimensional image data into a 2-dimensional image data when a displayed position of the 3-dimensional image data is moving; and
a controller switching a display mode of the display between a 3-dimensional display mode and a 2-dimensional display mode,
wherein when part of a 3-dimensional image displayed on the display is moving,
the image converter only converts a 3-dimensional image data of the moving part into a 2-dimensional image data, and
the controller only switches the 3-dimensional display mode of the moving part to the 2-dimensional display mode.

6. The image data display apparatus according to claim 5, wherein the 3-dimensional image data previously includes a 2-dimensional select image information for selecting one viewpoint image data from a plurality of viewpoints image data, and the image converter selects a 2-dimensional image based on the 2-dimensional select image information.

7. The image data display apparatus according to claim 5, wherein the image converter selects a predetermined single viewpoint image data as a 2-dimensional image.

8. The image data display apparatus according to claim 5, wherein the image converter converts the 3-dimensional image data so that a plurality of viewpoints image data become identical, and displays the converted image data in the 3-dimensional display mode.

9. An image data displaying method capable of switching a display of an input 3-dimensional image data between a stereoscopic representation or a planar representation, comprising the steps of:
displaying the 3-dimensional image data in a manner switchable between a 3-dimensional representation and a 2-dimensional representation;
converting, when a displayed position of the 3-dimensional image data is moving, the moving 3-dimensional image data into a 2-dimensional image data; and
switching a display mode of the display between a 3-dimensional display mode and a 2-dimensional display mode,
wherein when part of a 3-dimensional image displayed on the display is moving,
converting only a 3-dimensional image data of the moving part into a 2-dimensional image data, and
switching only the 3-dimensional display mode of the moving part to the 2-dimensional display mode.

10. A computer-readable medium having instructions stored thereon, such that when the instructions are read and executed by a processor, the processor is configured to perform the steps of:
displaying the 3-dimensional image data in a manner switchable between a 3-dimensional representation and a 2-dimensional representation;

converting, when a displayed position of the 3-dimensional image data is moving, the moving 3-dimensional image data into a 2-dimensional image data; and switching a display mode of the display between a 3-dimensional display mode and a 2-dimensional display mode, wherein when part of a 3-dimensional image displayed on the display is moving, converting only a 3-dimensional image data of the moving part into a 2-dimensional image data, and switching only the 3-dimensional display mode of the moving part to the 2-dimensional display mode.

* * * * *